US009825521B2

(12) United States Patent
Khayat

(10) Patent No.: US 9,825,521 B2
(45) Date of Patent: Nov. 21, 2017

(54) METHOD AND APPARATUS FOR INDUCTIVE-KICK PROTECTION CLAMP DURING DISCONTINUOUS CONDUCTION MODE OPERATION

(71) Applicant: Texas Instruments Incorporated, Dallas, TX (US)

(72) Inventor: Joseph Maurice Khayat, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 29 days.

(21) Appl. No.: 14/466,463

(22) Filed: Aug. 22, 2014

(65) Prior Publication Data
US 2016/0056709 A1 Feb. 25, 2016

(51) Int. Cl.
*H02M 1/34* (2007.01)
*H02M 3/158* (2006.01)
*H02M 3/00* (2006.01)

(52) U.S. Cl.
CPC .......... *H02M 1/34* (2013.01); *H02M 3/1588* (2013.01); *H02M 3/005* (2013.01); *H02M 2001/344* (2013.01); *Y02B 70/1466* (2013.01)

(58) Field of Classification Search
CPC ............ H02M 1/32; H02M 1/36; H02M 3/00; H02M 3/07; H02M 3/10; H02M 3/33507; H02M 3/156; H02M 3/158; H02M 3/1584; H02M 3/1588
See application file for complete search history.

(56) References Cited

U.S. PATENT DOCUMENTS

| 5,736,842 A | * | 4/1998 | Jovanovic | ............... H02M 1/34 323/222 |
| 6,304,460 B1 | * | 10/2001 | Cuk | ........................ H02M 1/34 363/131 |
| 2006/0087295 A1 | * | 4/2006 | Jang | .................... H02M 3/1584 323/222 |
| 2009/0154035 A1 | * | 6/2009 | Galvano | ................ H02H 9/046 361/56 |
| 2010/0013451 A1 | * | 1/2010 | Nakamura | .......... H02M 3/1588 323/282 |
| 2010/0149703 A1 | * | 6/2010 | Yeh | ..................... H01L 27/0266 361/56 |

(Continued)

OTHER PUBLICATIONS

Merriam-Webster dictionary, http://www.merriam-webster.com/dictionary/decay.*

(Continued)

*Primary Examiner* — Gustavo Rosario Benitez
(74) *Attorney, Agent, or Firm* — John R. Pessetto; Charles A. Brill; Frank D. Cimino

(57) ABSTRACT

A method includes determining that a current at an inductor in a series transfer capacitor buck converter is decaying to zero during a first cycle. The method also includes, in response to determining that the current at the inductor is decaying to zero, enabling an electrostatic discharge (ESD) structure and turning off a low side transistor. The ESD structure is disposed at a node connecting the low side transistor, a high side transistor and the inductor. The method further includes disabling the ESD structure before the high side transistor is turned on during a next cycle following the first cycle.

16 Claims, 3 Drawing Sheets

(56) References Cited

U.S. PATENT DOCUMENTS

2011/0043955 A1* 2/2011 Noda .................... H02H 9/046
                                                    361/56
2012/0106008 A1* 5/2012 Lee ...................... H02M 3/156
                                                    361/18

OTHER PUBLICATIONS

Merriam-Webster dictionary, http://www.merriam-webster.com/dictionary/decay, May 17, 2016.*

* cited by examiner

METHOD AND APPARATUS FOR INDUCTIVE-KICK PROTECTION CLAMP DURING DISCONTINUOUS CONDUCTION MODE OPERATION

TECHNICAL FIELD

This disclosure is generally directed to switching power converter topologies. More specifically, this disclosure is directed to a method and apparatus for an inductive-kick protection clamp of the phase node in a series transfer capacitor buck converter during a discontinuous conduction mode (DCM) operation when the synchronous rectifier is turned off resulting in the phase node boosting above the input voltage of the power stage.

BACKGROUND

A buck converter is a voltage step-down and current step-up converter that provides an efficient mechanism to reduce the voltage of a DC power supply. In a buck converter, the current in an inductor is often controlled by two switches, typically a high side transistor providing power from the input power supply to the output during the switching pulse ON time, and a low side transistor that rectifies the output during the OFF time.

SUMMARY

This disclosure provides a method and apparatus for inductive-kick protection clamp during discontinuous conduction mode (DCM) operation in a buck converter.

In a first example, a method includes determining that a current at an inductor in a series transfer capacitor buck converter is decaying to zero during a first cycle. The method also includes, in response to determining that the current at the inductor is decaying to zero, enabling an electrostatic discharge (ESD) structure and turning off a low side transistor. The ESD structure is disposed at a node connecting the low side transistor, a high side transistor and the inductor. The method further includes disabling the ESD structure before the high side transistor is turned on during a next cycle following the first cycle.

In a second example, an apparatus includes a series transfer capacitor buck converter, an ESD structure, and a controller. The buck converter is configured to be coupled to a power supply and includes an inductor, a low side transistor, and a high side transistor. The ESD structure is disposed at a node connecting the low side transistor, the high side transistor, and the inductor. The controller is configured to determine that a current at the inductor is decaying to zero during a first cycle. The controller is also configured, in response to determining that the current at the inductor is decaying to zero, to enable the ESD structure and turn off the low side transistor. The controller is further configured to disable the ESD structure before the high side transistor is turned on during a next cycle following the first cycle.

In a third example, a series transfer capacitor buck converter circuitry includes an inductor, a low side transistor, a high side transistor, and an ESD structure disposed at a node connecting the low side transistor, the high side transistor, and the inductor. The buck converter circuitry also includes control circuitry configured to determine that a current at the inductor is decaying to zero during a first cycle. The control circuitry is also configured, in response to determining that the current at the inductor is decaying to zero, to enable the ESD structure and turn off the low side transistor. The control circuitry is further configured to disable the ESD structure before the high side transistor is turned on during a next cycle following the first cycle.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
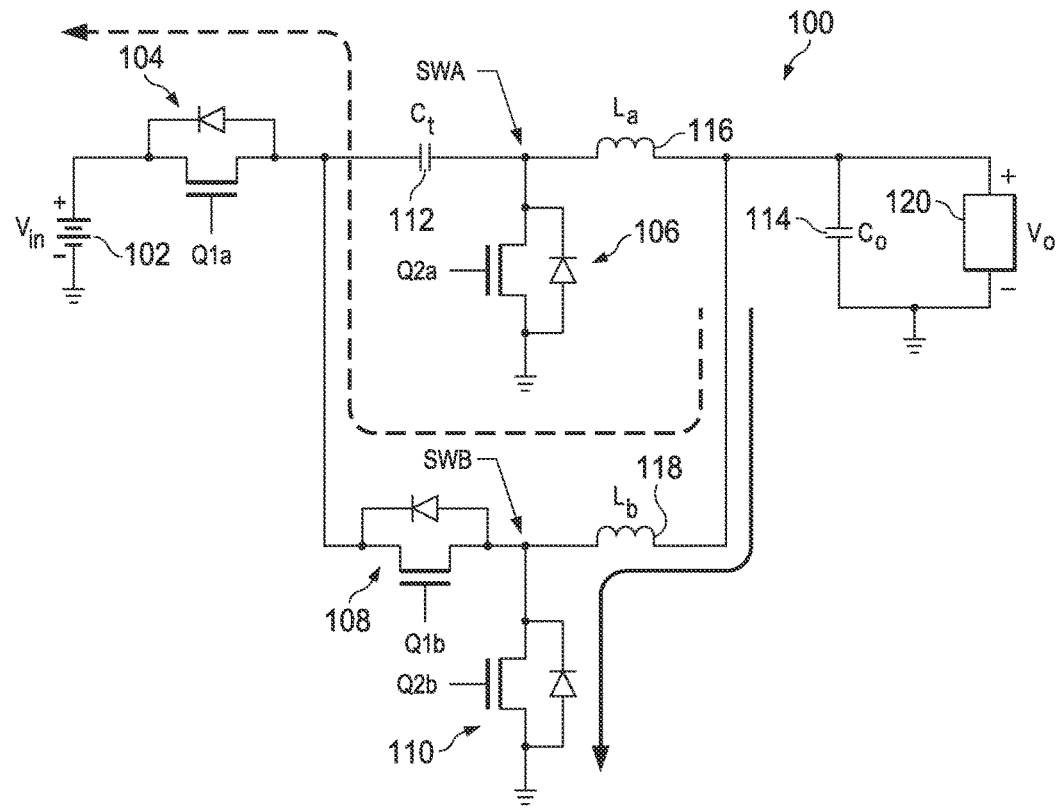
FIG. 1 illustrates an example series transfer capacitor buck converter topology in accordance with this disclosure.

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

This disclosure describes embodiments of a new high-frequency DC/DC series transfer capacitor buck converter topology that incorporates a transfer capacitor between two half bridge circuits. The first half bridge circuit includes a high side power transistor connected through a transfer capacitor Ct to a low side power synchronous rectifier transistor and a first inductor. The second half bridge circuit includes a high side power transistor connected directly to a low side synchronous rectifier transistor and a second inductor. The second half bridge circuit is a traditional buck converter half bridge circuit. The transfer capacitor achieves a steady state voltage of half the value of the input voltage $V_{in}$ of the series buck converter, thus permitting usage of half input supply rated power synchronous transistors. The transfer capacitor provides supply power for one of the half bridge circuits. Such a capacitor enables the utilization of lower breakdown low-side synchronous rectifier power field effect transistors (FETs).

In a buck converter with two switches and an inductor, there is typically both a direct current (DC) and a ripple current in the inductor such that the sum of the two currents creates a triangular waveform. In the inductor (as in many power converter topologies), it is often desirable that the average current remains constant, sometimes referred to as continuous conduction mode, or CCM. That is, in continuous conduction mode, the current through the inductor continuously cycles between upper and lower values around an average value. For example, in a continuous conduction mode having a 10 A±1 A cycle, the upper and lower values are 11 A and 9 A around an average of 10 A. As another example, in a continuous conduction mode having a 0 A±1 A cycle, the upper and lower values are +1 A and −1 A around an average of 0 A. In the latter example, current flow in the inductor changes direction during the cycle.

The continuous conduction mode may be achieved in the buck converter by performing the same operations, cycle to cycle. For example, at the beginning of a cycle, the first switch is turned on, and current rises in the inductor. At the end of the rise, the first switch is turned off and the second switch is turned on, and the current decays in the inductor to the starting point.

In some applications, it is desirable to improve the efficiency of a switching buck converter when the average current of the load approaches zero or is equal to zero. Maintaining CCM operation when the average current is zero reduces efficiency where switching losses start to dominate. Switching losses are a function of the switching frequency of the converter, whereby switching losses increase as switching frequency increases.

A common method to improve efficiency is to turn off the synchronous rectifier power transistor when the inductor current decays to zero, and engage a discontinuous conduction mode (DCM) operation. In concert with DCM, the switching frequency of the converter is allowed to decrease, thus reducing the switching losses and improving efficiency. Thus, the second example above, in which the current through the inductor cycles between −1 A and +1 A (with an average of 0 A), may be undesirable. Instead, it may be desirable for the current to terminate at zero when the inductor current decays to zero. The inductor current then remains at zero until the start of the next switching cycle.

To achieve this, when the current is positive and decays to zero, the synchronous rectifier switch can be shut off right around the time the current gets to zero. However, due to circuit delays and current level detection inaccuracies around the zero value, it is possible for the current to cross zero and change direction, going negative. If the synchronous rectifier switch is shut off while the current is still positive (that is, greater than zero), the body diode of the synchronous rectifier switch turns on to continue conducting current in the same direction as it approaches zero, and prevents change in direction of current since the body diode blocks reverse conduction. If the synchronous rectifier is shut off after the current changes direction to negative, the inductor forces the voltage at the common node of the first switch and the second switch to jump positive in order to maintain same current direction. Note the principle of an inductor that resists instantaneous current change by forcing a change in the direction of the voltage across it. In a series transfer buck converter, it is undesirable in the above mentioned situation to have the common nodal voltage between first and second transistors in the second half bridge to jump significantly high (that is, above the input voltage), because it will exceed the voltage rating of the second transistor.

The closing of the synchronous rectifier switch when the current at the inductor decays to zero is one example of discontinuous conduction mode (DCM) operation. In DCM, the "steady state-ness" of the operation is changed so that the operation is no longer considered to be a continuous conduction mode. In the buck converter described above, this change can be triggered by an event in which the current reversal in the inductor is intentionally avoided. To avoid a current reversal, the current decay is detected and, as soon as the current gets to zero, the system is shut off. Hence, DCM refers to the interruption of the continuous conduction mode cycle of a buck converter by shutting off the buck converter in order to avoid a current reversal in the inductor.

During DCM, the second half bridge inductor could cause the common node between the high side power transistor and the low side power synchronous rectifier transistor to exhibit short duration voltage transients greater than $V_{in}$ on the power FETs' common node. This voltage may be much higher than the rated voltage of the low side FET, thus leading to its breakdown. To avoid this scenario, embodiments of this disclosure provide a mechanism for protecting the low-side FET under the DCM operating condition.

The embodiments disclosed here are applicable to various power systems, such as those utilizing buck converter topologies where the low synchronous rectifier switch is rated lower than the input voltage. However, it will be understood that the disclosed embodiments may be applicable in other types of systems, as well.

FIG. 1 illustrates an example series transfer capacitor buck converter topology 100 in accordance with this disclosure. The embodiment of the topology 100 shown in FIG. 1 is for illustration only. Other embodiments of the topology 100 may be used without departing from the scope of this disclosure.

As shown in FIG. 1, the series transfer capacitor buck converter topology 100 includes a power supply 102 that provides an input supply voltage $V_{in}$. The topology 100 also includes four FET transistors $Q_{1a}$ 104, $Q_{2a}$ 106, $Q_{1b}$ 108, and $Q_{2b}$ 110. The topology 100 further includes two capacitors $C_t$ 112 and $C_o$ 114, two inductors $L_a$ 116 and $L_b$ 118, and an output 120.

The transistors $Q_{2a}$ 106 and $Q_{2b}$ 110 may be lower breakdown low-side synchronous rectifier power FETs. The capacitor $C_t$ 112 acts as a transfer capacitor between two half bridge circuits. The voltage capacity of the capacitor $C_t$ 112 can be about one-half of the input supply voltage $V_{in}$.

The transistors $Q_{2a}$ 106 and $Q_{1a}$ 104 are not connected in the same arrangement as the transistors $Q_{2b}$ 110 and $Q_{1b}$ 108. Instead, the capacitor $C_t$ 112 is connected between the transistors $Q_{2a}$ 106 and $Q_{1a}$ 104. This allows the transistors $Q_{2a}$ 106 and $Q_{2b}$ 110 to have a lower voltage rating. By way of example, in some systems, only the transistors $Q_{1a}$ 104 and $Q_{1b}$ 108 are rated to $V_{in}$, while the transistors $Q_{2a}$ 106 and $Q_{2b}$ 110 are rated to one-half of $V_{in}$. Note, however, that all four transistors 104-110 could be rated to $V_{in}$ or have any other suitable voltage rating(s). In order for the transistors $Q_{2a}$ 106 and $Q_{2b}$ 110 to have a lower rating, the capacitor $C_t$ 112 acts as a battery that in a steady-state has a voltage of one-half $V_{in}$. Thus, the drain voltage of the transistor $Q_{2a}$ 106 is $(V_{in}-\frac{1}{2}V_{in})=\frac{1}{2}V_{in}$.

The transistors $Q_{1b}$ 108 and $Q_{2b}$ 110 and the inductor $L_b$ 118 form a buck driver stage Phase B that includes the node SWB. Unlike a standard buck driver stage, the input supply power to Phase B is the same as the voltage across the capacitor $C_t$ 112. The SWA sequence is at ground so that the voltage across the capacitor $C_t$ 112 powers up phase B. Phase B's low side FET $Q_{2b}$ 110 is rated for less than the supply voltage $V_{in}$. This is because the rated voltage for the capacitor $C_t$ 112 is about half of the supply voltage $V_{in}$.

During certain operating conditions, the voltage at the node SWB could go higher than the voltage $V_{in}$, thus exceeding the rating of the low side transistor $Q_{2b}$ 110. Before describing such operating conditions, other conditions in which the voltage at the transistor $Q_{2b}$ 110 is not exceeded are first described.

In the topology 100, the transistors $Q_{1a}$ 104 and $Q_{1b}$ 108 are not on at the same time. Transistor $Q_{1b}$ 108 of Phase B turns on only when the transistor $Q_{2a}$ 106 is on. When the transistor $Q_{1a}$ 104 is on, the transistor $Q_{1b}$ 108 is off. When the transistor $Q_{1a}$ 104 is on, the transistor $Q_{2a}$ 106 is off. In one state of operation, energy goes from the power supply 102 through the transistor $Q_{1a}$ 104, across the capacitor $C_t$ 112, through the inductor $L_a$ 116, and to the output 120. In another state of operation, the transistor $Q_{1b}$ 108 is turned on, and the transistor $Q_{1a}$ 104 is off. In this state, the capacitor $C_t$ 112 has a charge of $\frac{1}{2}V_{in}$, so energy flows through the transistor $Q_{1b}$ 108, through the inductor $L_b$ 118, and to the output 120. Thus, the transistor $Q_{2b}$ 110 experiences no more than $\frac{1}{2}V_{in}$ on its drain.

As long as current flows in the direction toward the output 120, the voltage at the transistor $Q_{2b}$ 110 is not more than $\frac{1}{2}V_{in}$. However, there are states of operation when the current decays to zero and then becomes negative. Any time the load current on the output 120 is less than half the ripple current in the inductor $L_b$ 118, the transistor $Q_{2b}$ 110 reverses the current in the inductor $L_b$ 118. That is, instead of current flowing in the positive direction from the ground through $Q_{2b}$ 110 and through the inductor $L_b$ 118 to the output 120, current flows from the output 120 through the inductor $L_b$ 118 to ground in some states of operation as illustrated by the solid arrow in FIG. 1.

As the current decays, the current in the transistor $Q_{2b}$ 110 becomes negative and builds in the negative direction. To save switching power loss as in CCM operation, a DCM operation may be used in which the transistors $Q_{2a}$ 106 and $Q_{2b}$ 110 are prevented from having negative current by turning off at a time where the current approaches zero. However, as soon as the transistor $Q_{2b}$ 110 is turned off during its timing in the cycle to prevent current reversal, and if it turns off after the current goes negative due to circuit delays or zero current detection errors, the drain voltage on the transistor $Q_{2b}$ 110 jumps higher very quickly due to the inductor $L_b$ 118 preventing a sudden change in the current. This is a residual current in the inductor $L_b$ 118 that needs to collapse back to zero in a short transient event. If the transistor $Q_{2a}$ 106 is off during this time period, the drain on the transistor $Q_{2b}$ 110 could momentarily spike above $V_{in}$ so that the residual current in the inductor $L_b$ 118 recirculates into $V_{in}$, as illustrated by the dashed arrow in FIG. 1. This scenario could force the drain on the node SWB to rise above $V_{in}$ in two diodes. This far exceeds the voltage rating of the transistor $Q_{2b}$ 110.

Figure 2:
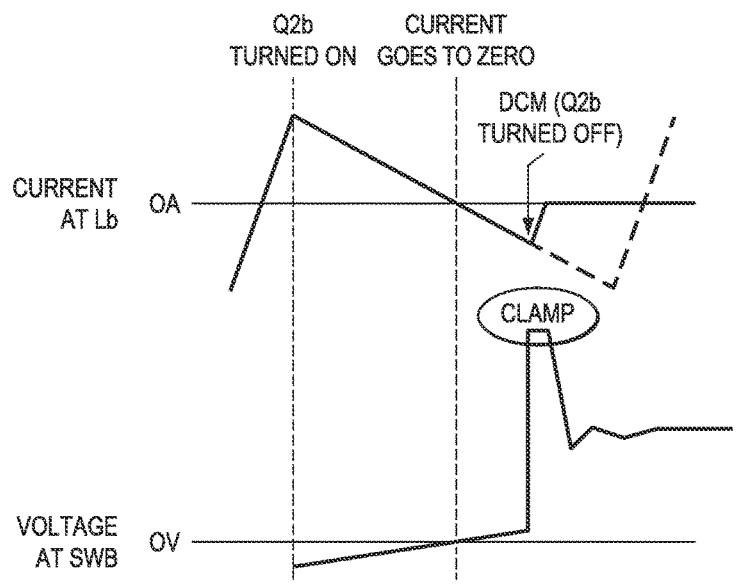
FIG. 2 illustrates a problem of inductive-kick voltage spikes in a series transfer capacitor buck converter topology.

FIG. 2 illustrates a problem of inductive-kick voltage spikes in a series transfer capacitor buck converter topology. The top diagram illustrates the current at the inductor $L_b$ 118 over one continuous conduction mode cycle. The bottom diagram illustrates the corresponding voltage at the node SWB.

As shown in FIG. 2, the current at the inductor $L_b$ 118 is sourced to the load when the transistor $Q_{2b}$ 110 is turned on, meaning when the current at the inductor $L_b$ 118 hits a peak. At that point, the voltage at the node SWB goes negative. The current at the inductor $L_b$ 118 decays to 0 A and changes direction. The SWB voltage crosses 0V and goes positive. If a continuous conduction mode cycle were to continue in which the transistor $Q_{2b}$ 110 stayed on, the current would follow the dashed line as shown in the top diagram of FIG. 2. To prevent negative current at the inductor $L_b$ 118, a DCM operation may be used in which the transistor $Q_{2b}$ 110 is turned off.

If the transistor $Q_{2b}$ 110 is turned off after the voltage at the node SWB crosses zero going positive, the voltage at the node SWB rises quickly so that the current finds a path to decay to zero. If the transistor $Q_{2a}$ 106 is off during this event, and if there is no voltage clamp implemented on the node SWB, the voltage could rise higher than $V_{in}$ where the decaying current flows through the body diodes of the Phase B FETs (the transistors $Q_{1b}$ 108 and $Q_{1a}$ 104). The duration of the decaying current is very short, almost like a transient event, particularly if the voltage difference between $V_{in}$ and $V_o$ is large. Thus, there is a region of operation where the drain on Phase B could climb higher than the rated voltage and could climb very quickly. This scenario could destroy the transistor $Q_{2b}$ 110 due to high current.

The destruction of the transistor $Q_{2b}$ 110 can be reduced or prevented if a voltage clamp is used. By introducing a safe level voltage clamp, the residual transient current in the inductor $L_b$ 118 decays to zero in the clamp. Since the rise time of the voltage at the node SWB is very fast and the transient current decay is very short (typically on the order of tens of nanoseconds), the clamp should operate very quickly.

Figure 3:
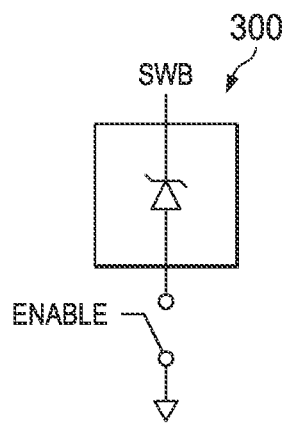
FIG. 3 illustrates an example electrostatic discharge (ESD) structure for use as a voltage clamp in accordance with this disclosure.

FIG. 3 illustrates an example electrostatic discharge (ESD) structure 300 for use as a voltage clamp in accordance with this disclosure. The ESD structure 300 may be utilized to absorb the energy and protect the SWB voltage. ESD-type structures are fast enough to respond to the rapid rise of the voltage on the SWB drain and can keep the voltage from climbing too high and dissipate the energy. In some examples, the ESD structure 300 can turn on within 10 nanoseconds. The fast speed nature of the ESD structure 300 and its ability to integrate with the power device makes it suitable for such a clamp application.

Figure 4:
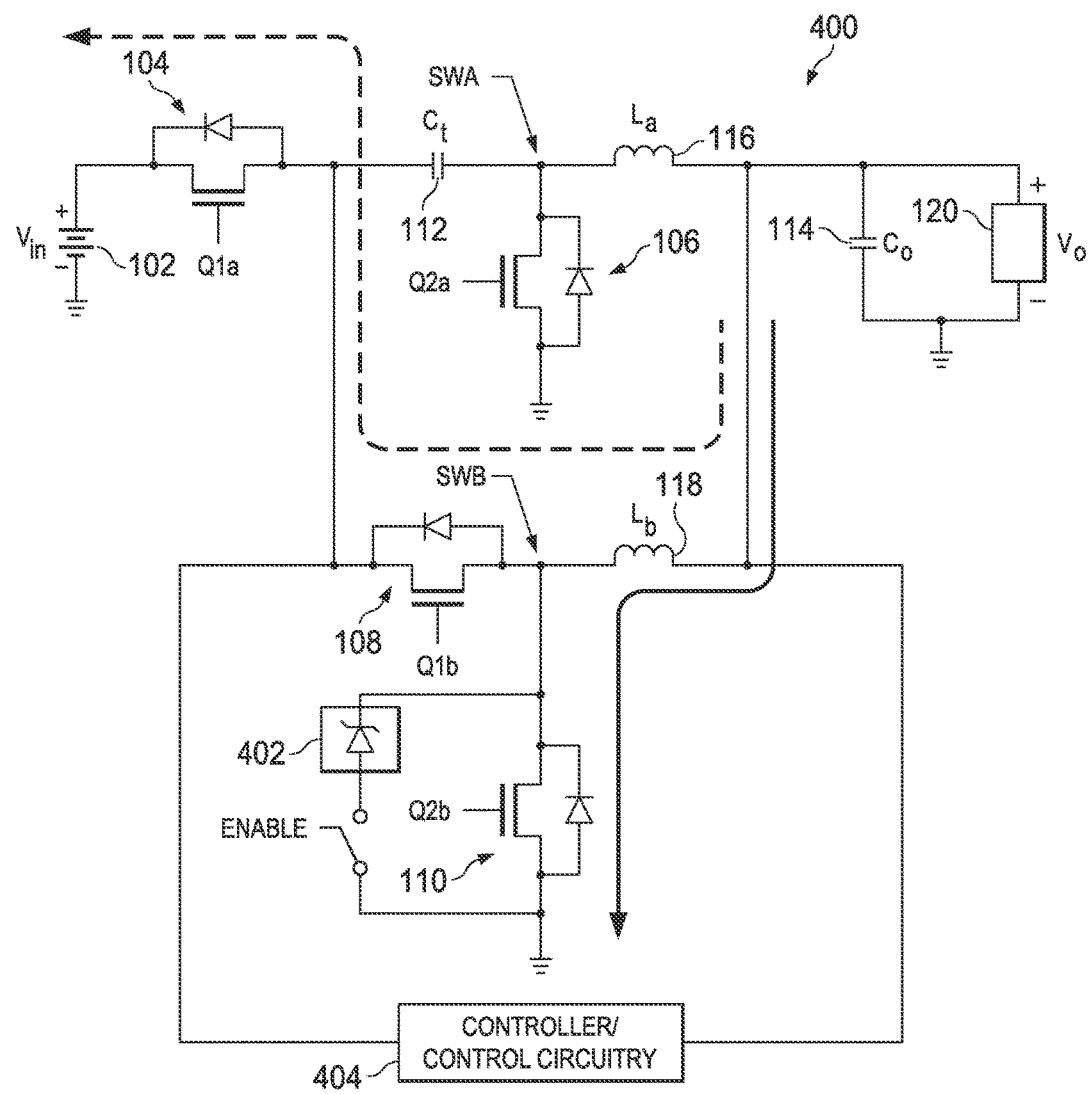
FIG. 4 illustrates an example series transfer capacitor buck converter topology that utilizes an internal ESD structure as a voltage clamp in accordance with this disclosure.

FIG. 4 illustrates an example series transfer capacitor buck converter topology 400 that utilizes an internal ESD structure as a voltage clamp in accordance with this disclosure. The topology 400 may represent or be used in conjunction with the series transfer capacitor buck converter topology 100 of FIG. 1. The embodiment of the topology 400 shown in FIG. 4 is for illustration only. Other embodiments of the topology 400 may be used without departing from the scope of this disclosure.

As shown in FIG. 4, the series transfer capacitor buck converter topology 400 includes many of the same components as shown in FIG. 1. A detailed description of those components will therefore not be repeated here.

The series transfer capacitor buck converter topology 400 also includes an ESD structure 402 (such as the ESD structure 300 of FIG. 3) and a controller 404. The ESD structure 402 is positioned between the node SWB and ground, in parallel with the transistor $Q_{2b}$ 110. In some embodiments, the ESD structure 402 is an ESD-type FET as is known in the art. The ESD structure 402 serves as an active protection inductive-kick clamp for the node SWB. The ESD structure 402 is enabled just prior to engaging the DCM event and then disabled just before the next switching cycle. That is, the ESD structure 402 is enabled just before the transistor $Q_{2b}$ 110 is turned off when the current at the inductor $L_b$ 118 decays to zero and starts to go negative. The ESD structure 402 is disabled just before the transistor $Q_{1b}$ 108 is turned on during the next cycle.

The controller 404 is communicatively coupled to one or more of the transistors $Q_{1b}$ 108 and $Q_{2b}$ 110, the inductor $L_b$ 118, and the ESD structure 402. The controller 404 may represent any controlling device or control circuitry configured to detect current and voltage levels within the topology 400, and enable or disable any one or more of the transistors $Q_{1b}$ 108 and $Q_{2b}$ 110 and the ESD structure 402. In some embodiments, the controller 404 may include signal lines that are directly coupled to one or more gates of the transistors $Q_{1b}$ 108 and $Q_{2b}$ 110 and the ESD structure 402.

ESD structures are designed to provide protection during short transient events by quickly absorbing energy for a short duration. Similarly, the ESD structure 402 protects the voltage at the node SWB during a transient inductive kick when the transistor $Q_{2b}$ 110 turns off under a reverse sinking current condition.

The active clamping of reverse inductor voltage on a phase node is not very common since the FET is often rated to meet the voltage overshoot. However, as described above, in systems having lower-rated FETs like the series transfer capacitor buck converter topology 400, some method of clamping the voltage may be needed to avoid a FET breakdown.

The placement of external style clamps at the node has been considered as a possible solution, but the use of external style clamps is ineffective. For example, external clamps have longer response times, and the voltage rise times are so short that an external component does not have enough time to react to protect the internal FET. Also, external clamps have to go through package inductance. Furthermore, external clamps tend to be more expensive and consume part of what is typically a limited board area. In contrast, the internal ESD structure 402 is positioned in very close proximity to the power FET $Q_{2b}$ 110, thus mitigating any internal trace or bondwire inductance.

Although FIG. 4 illustrates one example of a series transfer capacitor buck converter topology 400 that utilizes an internal ESD structure as a voltage clamp, various changes may be made to FIG. 4. For instance, the example shown in FIG. 4 is for illustration only. Other implementations of the topology 400 may be used, as well.

Figure 5:
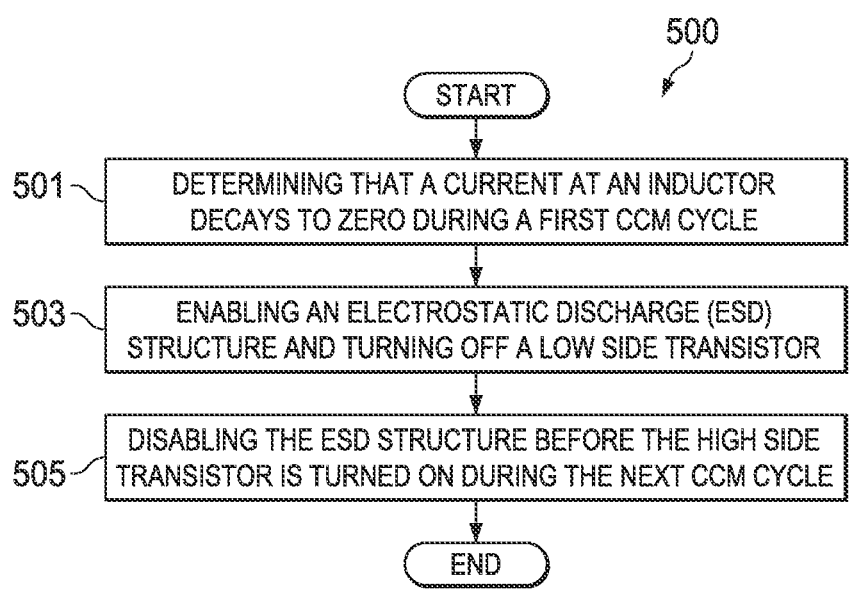
FIG. 5 illustrates an example method for inductive-kick voltage clamping in accordance with this disclosure.

FIG. 5 illustrates an example method 500 for inductive-kick voltage clamping according to this disclosure. For ease of explanation, the method 500 is described with respect to the buck converter topology 400 shown in FIG. 4. The method 500 may be used with any other suitable topology.

At step 501, a current at an inductor (such as the inductor $L_b$ 118) in a buck converter is determined to decay to zero during a first cycle in a continuous conduction mode. This could include, for example, a controller (such as the controller 402) determining that the current decays to zero.

At step 503, in response to the determination that the current at the inductor decays to zero, an ESD structure (such as the ESD structure 402) is enabled and a low side transistor (such as the transistor $Q_{2b}$ 110) is turned off. The ESD structure is disposed at a node connecting the low side transistor, a high side transistor (such as the transistor $Q_{1b}$ 108), and the inductor. The enabling of the ESD structure clamps a voltage rise at the node caused by turning off the low side transistor. In some embodiments, the ESD structure is enabled just before the low side transistor is turned off.

At step 505, the ESD structure is disabled before the high side transistor is turned on again during the next cycle of the continuous conduction mode. The entire process could be repeated again any number of times during operation of the buck converter topology.

Although FIG. 5 illustrates one example of a method 500 for inductive-kick voltage clamping, various changes may be made to FIG. 5. For example, while FIG. 5 illustrates a series of steps, various steps in each figure could overlap, occur in parallel, occur in a different order, or occur any number of times. Also, one or more of the steps of the method 500 could be removed, or other steps could be added to the method 500.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    determining that a current at an inductor in a series transfer capacitor buck converter is decaying to zero during a first cycle;
    in response to determining that the current at the inductor is decaying to zero, enabling an electrostatic discharge (ESD) structure and turning off a low side transistor, the ESD structure disposed at a node connecting the low side transistor, a high side transistor and the inductor; and
    disabling the ESD structure before the high side transistor is turned on during a next cycle following the first cycle; wherein enabling the ESD structure clamps a voltage rise at the node caused by turning off the low side transistor.

2. The method of claim 1, wherein turning on the low side transistor during the first cycle, wherein the current at the inductor decays to zero in response to the low side transistor turning on.

3. The method of claim 1, wherein the ESD structure is enabled just before the low side transistor is turned off.

4. The method of claim 1, wherein the low side transistor is rated for a voltage that is approximately one half of a supply voltage.

5. The method of claim 1, wherein the low side transistor is a low side synchronous rectifier power field effect transistor (FET) and the high side transistor is a high side power FET.

6. The method of claim 1, wherein the series transfer capacitor buck converter further comprises a transfer capacitor disposed between two half bridge circuits, the transfer capacitor having a charge capacity approximately equal to one-half of a supply voltage.

7. The method of claim 1, wherein the ESD structure comprises an ESD field effect transistor (FET).

8. An apparatus comprising:
    a series transfer capacitor buck converter configured to be coupled to a power supply, the series transfer capacitor buck converter comprising an inductor, a low side transistor, and a high side transistor;
    an electrostatic discharge (ESD) structure disposed at a node connecting the low side transistor, the high side transistor, and the inductor; and
    a controller configured to:

determine that a current at the inductor is decaying to zero during a first cycle;

in response to determining that the current at the inductor is decaying to zero, enable the ESD structure and turn off the low side transistor;

disable the ESD structure before the high side transistor is turned on during a next cycle following the first cycle; and turn on the low side transistor during the first cycle and cause the current at the inductor to decay to zero;

wherein the ESD structure is configured when enabled to clamp a voltage rise at the node caused by turning off the low side transistor.

9. The apparatus of claim 8, wherein the ESD structure is enabled just before the low side transistor is turned off.

10. The apparatus of claim 8, wherein the low side transistor is rated for a voltage that is approximately one-half of a supply voltage.

11. The apparatus of claim 8, wherein the low side transistor is a low side synchronous rectifier power field effect transistor (FET) and the high side transistor is a high side power FET.

12. The apparatus of claim 8, wherein the series transfer capacitor buck converter further comprises a transfer capacitor disposed between two half bridge circuits, the transfer capacitor having a charge capacity approximately equal to one-half of a supply voltage.

13. The apparatus of claim 8, wherein the ESD structure comprises an ESD field effect transistor (FET).

14. A series transfer capacitor buck converter circuitry comprising:

an inductor;

a low side transistor;

a high side transistor;

an electrostatic discharge (ESD) structure disposed at a node connecting the low side transistor, the high side transistor, and the inductor; and control circuitry configured, in a discontinuous conduction mode of the series transfer capacitor buck converter circuitry, to:

determine that a current at the inductor is decaying to zero during a first cycle;

in response to determining that the current at the inductor is decaying to zero, enable the ESD structure and turn off the low side transistor;

disable the ESD structure before the high side transistor is turned on during a next cycle following the first cycle; and turn on the low side transistor during the first cycle and cause the current at the inductor to decay to zero;

wherein the ESD structure is configured when enabled to clamp a voltage rise at the node caused by turning off the low side transistor.

15. The series transfer capacitor buck converter circuitry of claim 14, wherein the ESD structure is enabled just before the low side transistor is turned off.

16. The series transfer capacitor buck converter circuitry of claim 14, wherein the low side transistor is rated for a voltage that is approximately one-half of a supply voltage.

* * * * *